United States Patent
Barron, III et al.

(10) Patent No.: US 12,312,178 B2
(45) Date of Patent: May 27, 2025

(54) TELESCOPING CONVEYOR

(71) Applicant: FedEx Corporation, Memphis, TN (US)

(72) Inventors: John A. Barron, III, Canonsburg, PA (US); Colin Askew, Alexandria, MN (US); Jason Hoyt, Alexandria, MN (US); Jared Spindler, Glenwood, MN (US); James Glade, Alexandria, MN (US)

(73) Assignee: FedEx Corporation, Memphis, TN (US)

( * ) Notice: Subject to any disclaimer, the term of this patent is extended or adjusted under 35 U.S.C. 154(b) by 0 days.

(21) Appl. No.: 18/444,442

(22) Filed: Feb. 16, 2024

(65) Prior Publication Data

US 2024/0286843 A1   Aug. 29, 2024

Related U.S. Application Data

(60) Provisional application No. 63/448,038, filed on Feb. 24, 2023.

(51) Int. Cl.
*B65G 15/26*   (2006.01)
*B65G 15/12*   (2006.01)
(Continued)

(52) U.S. Cl.
CPC .............. *B65G 15/26* (2013.01); *B65G 15/12* (2013.01); *B65G 41/008* (2013.01);
(Continued)

(58) Field of Classification Search
None
See application file for complete search history.

(56) References Cited

U.S. PATENT DOCUMENTS 5,403,142 A * 4/1995 Stewart .................. B65G 67/02
                                                     414/398
5,796,052 A * 8/1998 Christmann ........... G01G 11/00
                                                     177/121
(Continued)

FOREIGN PATENT DOCUMENTS

CN   107879135   4/2018
CN   209396606   9/2019
(Continued)

OTHER PUBLICATIONS

International Search Report and Written Opinion in International Appln No. PCT/US2024/016943, mailed on Jul. 31, 2024, 25 pages.
(Continued)

*Primary Examiner* — Kavel Singh
(74) *Attorney, Agent, or Firm* — Fish & Richardson P.C.

(57) ABSTRACT

Extendable conveyor system and operating processes for the same. An extendable conveyor system that includes a plurality of conveyor segments, a conveyor extension/retraction system, and a control system. The plurality of conveyor segments are interlocked in a telescoping configuration with individual conveyor segments at least partially overlapping one another. The conveyor extension/retraction system is operatively coupled to at least one of the conveyor segments and configured to control the extension and retraction of the extendable conveyor system by controlling movement of the conveyor segments relative to one another. The control system is in electrical communication with the conveyor extension/retraction system and configured to perform operations that include adjusting a position of one or more conveyor segments responsive to data received from a package handling robot in electronic communication with the control system.

3 Claims, 14 Drawing Sheets

(51) Int. Cl.
  *B65G 41/00* (2006.01)
  *B65G 43/10* (2006.01)
  *B65G 69/28* (2006.01)

(52) U.S. Cl.
  CPC .......... *B65G 69/2805* (2013.01); *B65G 43/10* (2013.01); *B65G 2203/0283* (2013.01); *B65G 2811/093* (2013.01)

(56) References Cited

U.S. PATENT DOCUMENTS

| | | | |
|---|---|---|---|
| 9,950,868 B1* | 4/2018 | Baek | B65G 23/22 |
| 10,005,627 B2 | 6/2018 | Girtman et al. | |
| 11,518,629 B2* | 12/2022 | Griggs | B65G 67/08 |
| 11,554,923 B2* | 1/2023 | Christen | B65G 47/31 |
| 2014/0326580 A1 | 11/2014 | Carpenter et al. | |
| 2021/0122589 A1 | 4/2021 | Griggs | |

FOREIGN PATENT DOCUMENTS

| ES | 2478517 | 7/2014 |
|---|---|---|
| WO | WO 2010136789 | 12/2010 |

OTHER PUBLICATIONS

Invitation to Pay Additional Fees in International Appln No. PCT/US2024/016943, mailed on Jun. 6, 2024, 13 pages.

* cited by examiner

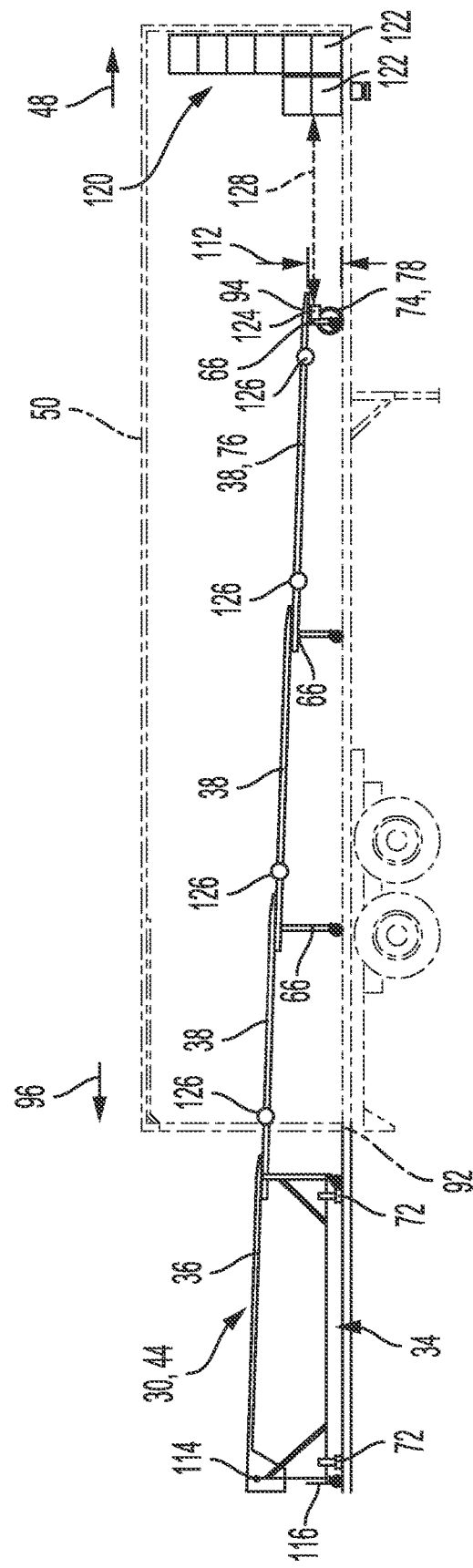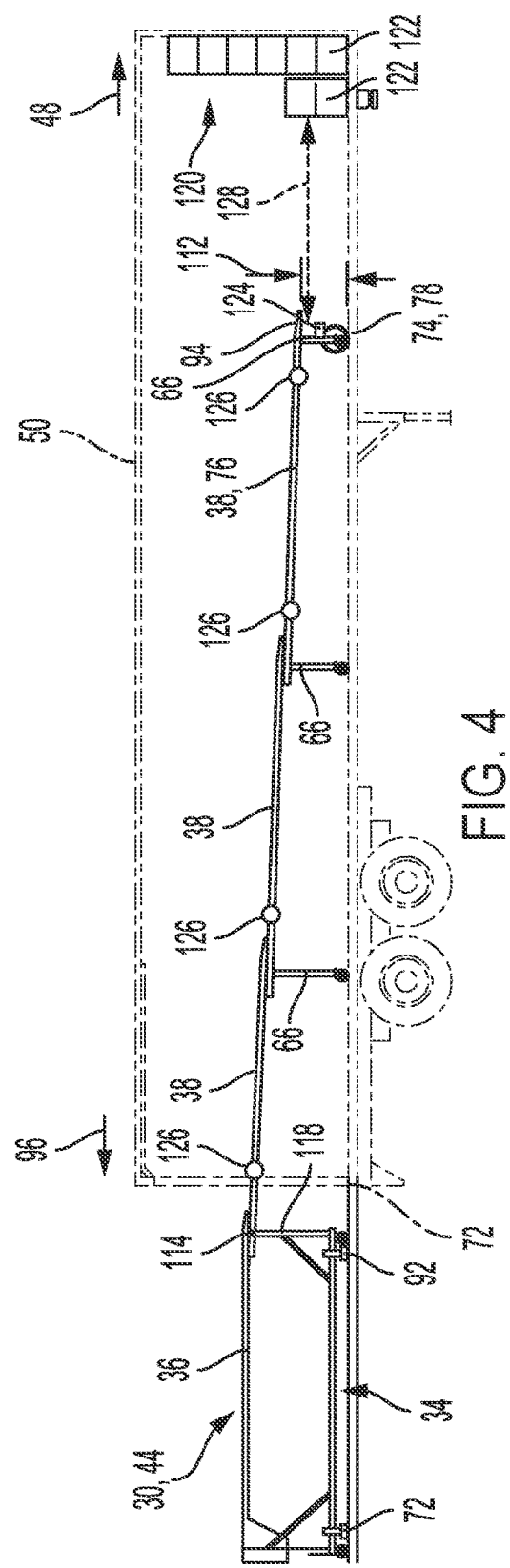
FIG. 3
FIG. 4

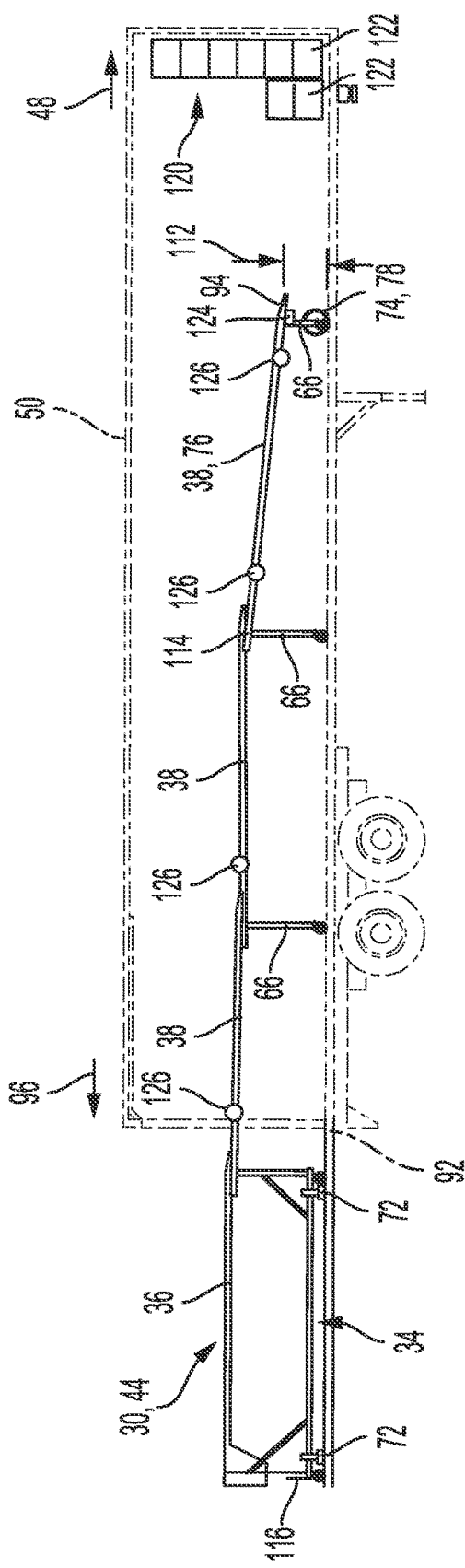
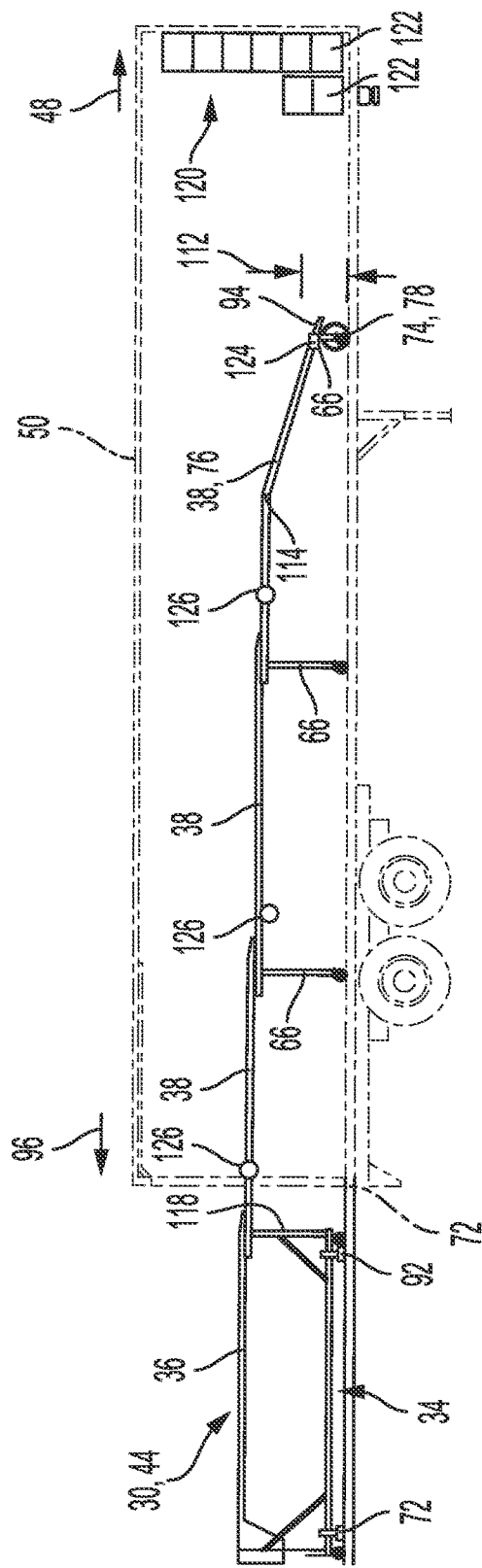
FIG. 5
FIG. 6

TELESCOPING CONVEYOR

CROSS-REFERENCE TO RELATED APPLICATION

This application claims the benefit of the filing date of U.S. Provisional Application No. 63/448,038, filed on Feb. 24, 2023. The contents of U.S. Application No. 63/448,038 are incorporated herein by reference in their entirety.

BACKGROUND

Conveyor systems are used in many different industries to move objects through a facility efficiently. For instance, conveyor systems are used in manufacturing to move individual components around a manufacturing facility. Conveyor systems are also used in distribution facilities to move packages throughout the facility. Conveyor systems are used in shipping and receiving facilities to route packages through sorting facilities and to shipping container or vehicles. Improvements in such conveyance systems are sought to continually improve efficient routing of objects within such industries.

SUMMARY

This specification relates an extendable conveyor system and the operations of such a system.

In general, innovative aspects of the subject matter described in this specification can be embodied in methods that include the operations of obtaining a first distance between a front end of a conveyor system and at least one object positioned in front of the conveyor system from a sensor system. The operations include determining that the first distance is less than a first predefined distance. And, the operations include controlling the conveyor system to move to increase a distance from the at least one object in response to the first distance being less than the first predefined distance. Other implementations of this aspect include corresponding systems, apparatus, and computer programs, configured to perform the actions of the methods, encoded on computer storage devices. These and other implementations can each optionally include one or more of the following features.

In some implementations, determining that the first distance is less than the first predefined distance includes comparing a measured value of the first distance to the first predefined distance.

In some implementations, the first predefined distance includes a user selected value.

In some implementations, controlling the conveyor system includes sending instructions to one or more motor controllers that cause the conveyor system to retract until the first distance is equal to or greater than the first predefined distance.

In some implementations, the conveyor system is an extendable conveyor system that comprises a first conveyor segment and a second conveyor segment configured to nest underneath the first conveyor segment, and wherein the one or more motor controllers control relative movement between the first conveyor segment and the second conveyor segment.

In some implementations, the first distance is the shortest distance between the front end of the conveyor system and a plurality of objects.

In some implementations, the operations include controlling the front end of the conveyor system to move laterally relative to a length of the conveyor system.

In some implementations, controlling the front end of the conveyor system to move laterally includes moving the front end in response to measurement data from the sensor system.

In some implementations, controlling the front end of the conveyor system to move laterally includes sending instructions to one or more motor controllers that control lateral movement of the conveyor system in response to measurement data from the sensor system.

In some implementations, the operations include: obtaining, from at least a first side mounted sensor of the sensor system, a second distance between a first side of the conveyor system and a second object; obtaining, from a second side mounted sensor of the sensor system, a third distance between the second side of the conveyor system and a third object; determining that a difference between the second distance and the third distance exceeds a threshold difference value; and in response, controlling the conveyor system to move such that the difference is within the threshold difference value.

In some implementations, the conveyor system includes an interface for connecting a robot to the conveyor system and the operation of obtaining the first distance includes obtaining the first distance from the robot through the interface.

In some implementations, the operations include obtaining package flow data indicating a rate package flow along the conveyor system; and controlling, based on the package flow data, operation of independent indexing sections of the conveyor system.

In some implementations, controlling the operation of the independent indexing sections includes controlling at least one independent indexing section to adjust buffering distances between packages by varying the speed of the at least one independent indexing section.

Another general aspect can be embodied in an extendable conveyor system that includes a plurality of conveyor segments, a conveyor extension/retraction system, and a control system. The plurality of conveyor segments are interlocked in a telescoping configuration with individual conveyor segments at least partially overlapping one another. The conveyor extension/retraction system is operatively coupled to at least one of the conveyor segments and configured to control the extension and retraction of the extendable conveyor system by controlling movement of the conveyor segments relative to one another. The control system is in electrical communication with the conveyor extension/retraction system and configured to perform operations that include adjusting a position of one or more conveyor segments responsive to data received from a package handling robot in electronic communication with the control system. In some implementations, the control system can be configured to perform any one or more of the operations discussed above.

In some implementations, each conveyor segment includes one or more indexing sections, and the operations of the control system include controlling a speed of one indexing section independent from other indexing sections responsive to second data received from the package handling robot.

In some implementations, a forward most conveyor segment of the plurality of conveyor segments includes an articulating end configured to pivot relative to the forward most conveyor segment.

In some implementations, a base conveyor segment of the plurality of conveyor segments includes a package stop configured to raise and lower responsive to control signals from the control system.

In some implementations, the plurality of conveyor segments include a base conveyor segment configured to receive packages from a gravity chute, an end conveyor segment, and one or more middle conveyor segments arranged between the base conveyor segment and the end conveyor segment.

In some implementations, the base conveyor segment of the plurality of conveyor segments includes a package stop configured to raise and lower responsive to control signals from the control system.

In some implementations, the one or more middle conveyor segments each comprise an independently controllable conveyor belt.

In some implementations, the forward most conveyor segment includes a plurality of rollers including at least a first set of powered rollers and a second set of powered rollers with the first set of powered rollers separated from the second set of powered rollers by a set of unpowered rollers.

In some implementations, the forward most conveyor segment includes an articulating end configured to pivot relative to a forward end of the end conveyor segment.

Another general aspect can be embodied in an extendable conveyor system that includes a plurality of conveyor segments, a conveyor extension/retraction system, a sensor system, and a control system. The plurality of conveyor segments are interlocked in a telescoping configuration with individual conveyor segments at least partially overlapping one another. The conveyor extension/retraction system is operatively coupled to at least one of the conveyor segments and configured to control the extension and retraction of the extendable conveyor system by controlling movement of the conveyor segments relative to one another. The control system is in electrical communication with the conveyor extension/retraction system and with the sensor system, the control system configured to perform operations that include: obtaining, from the sensor system, a first distance between a front end of the conveyor system and at least one object positioned in front of the conveyor system; determining that the first distance is less than a first predefined distance; and in response to the first distance being less than the first predefined distance, controlling the conveyor extension/retraction system to move the conveyor segments to increase a distance from the at least one object. In some implementations, the control system of can be configured to perform any one or more of the operations discussed above.

In some implementations, the plurality of conveyor segments include a base conveyor segment configured to receive packages from a gravity chute, an end conveyor segment, and one or more middle conveyor segments arranged between the base conveyor segment and the end conveyor segment.

In some implementations, the base conveyor segment of the plurality of conveyor segments includes a package stop configured to raise and lower responsive to control signals from the control system.

In some implementations, the one or more middle conveyor segments includes each comprise an independently controllable conveyor belt.

In some implementations, the forward most conveyor segment includes a plurality of rollers including at least a first set of powered rollers and a second set of powered rollers with the first set of powered rollers separated from the second set of powered rollers by a set of unpowered rollers.

In some implementations, the forward most conveyor segment includes an articulating end configured to pivot relative to a forward end of the end conveyor segment.

Particular implementations of the subject matter described in this specification can be implemented so as to realize one or more of the following advantages. Implementations may improve the efficiency of performing package loading operations. Implementations may reduce worker fatigue by maintaining a proper distance between the end of a conveyor and a package loading site.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3-6 are elevation views of various configurations for adjustable height at a delivery end of the extendable conveyor system of FIG. 1;

Like reference numbers and designations in the various drawings indicate like elements.

DETAILED DESCRIPTION

Implementations of the present disclosure generally relate to an extendable conveyor system. The conveyor system can be configured to extend and retract automatically, under user control, or by interaction with a robot. The extendable conveyor system will be described within the exemplary use context of loading shipping trailers. However, such a system may be used in various other contexts and/or industries, e.g., in warehousing operations, manufacturing operations, agricultural operations, etc.

Figure 1:
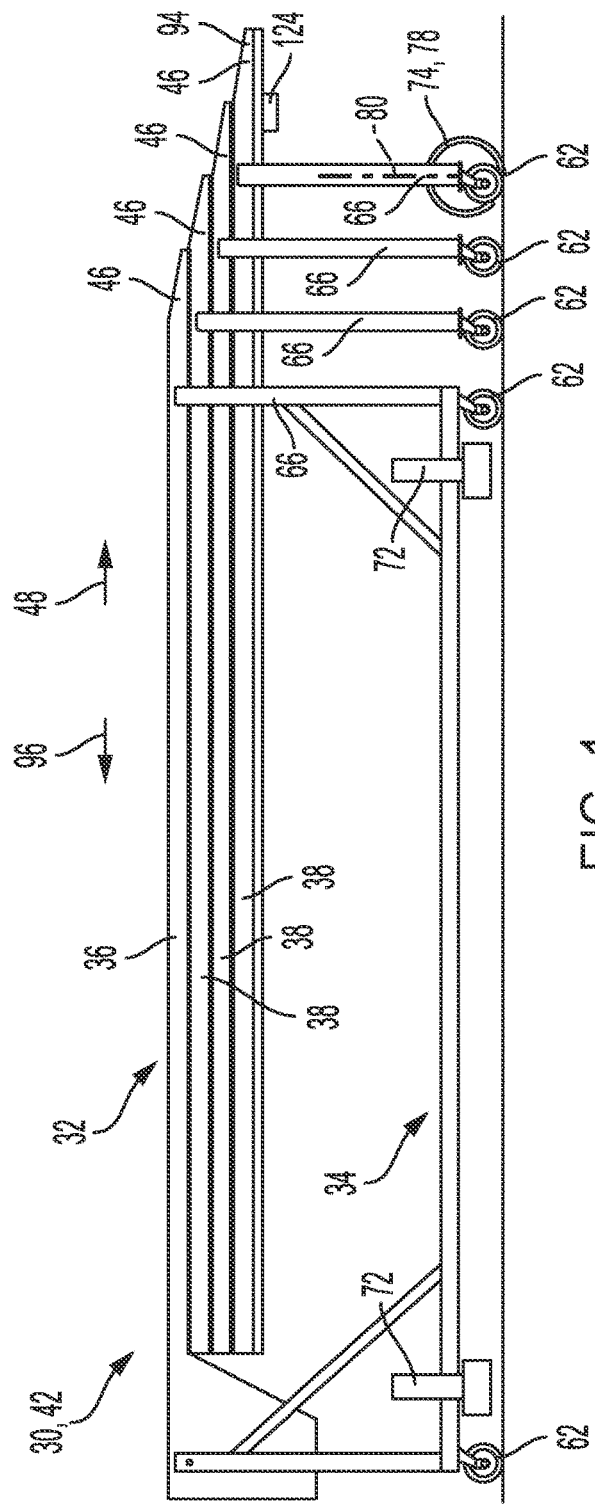
FIG. 1 is an elevation view of an exemplary extendable conveyor system in a transport configuration for shipping vehicle according to an implementation of the disclosure.
Figure 2:
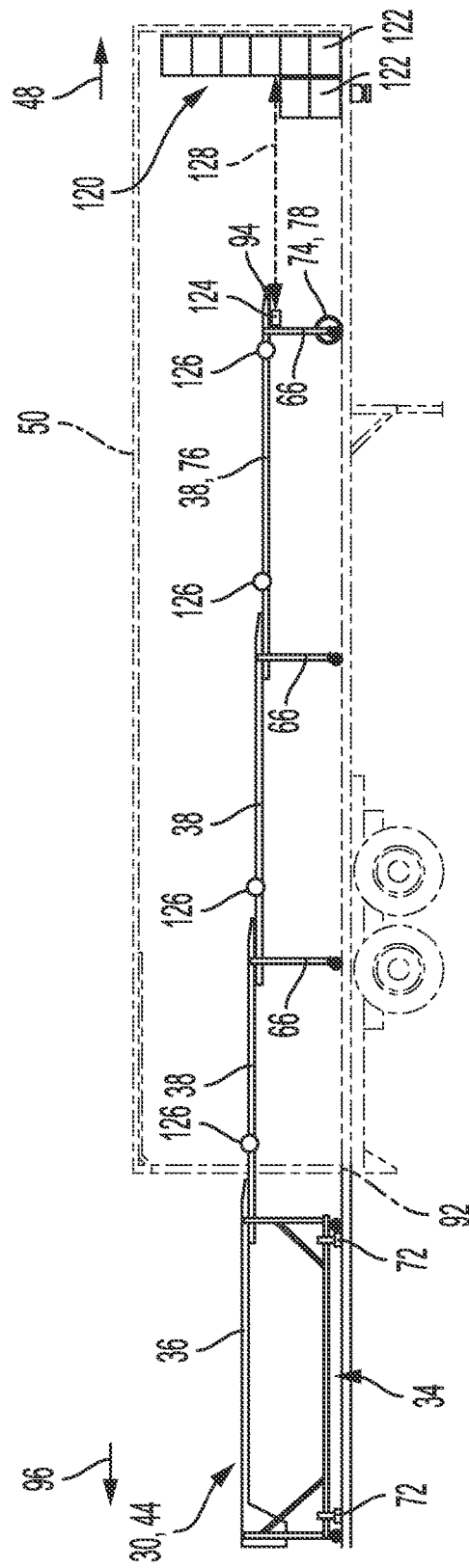
FIG. 2 is an elevation view of the extendable conveyor system of FIG. 1 in an extended configuration according to an implementation of the disclosure.

Referring to FIGS. 1 and 2, an extendable conveyor system 30 is depicted according to an embodiment of the disclosure. As shown, the extendable conveyor system 30 is configured for loading shipping vehicles such as flatbed trailers. The extendable conveyor system 30 includes an assembly of conveyor segments 32 supported by a frame 34. The frame 34 forms a support structure from which the conveyor segments 32 are extended and into which they are retracted. The assembly of conveyor segments 32 can include a base conveyor segment 36 and one or more extension conveyor segments 38 nested below the base conveyor segment 36. The conveyor segments 36, 38 of the conveyor segment assembly 32 are slidingly coupled to each other for arrangement in a transport or stowed configuration 42 (FIG. 1) or an operating or extended configuration 44 (FIG. 2). The base conveyor segment 36 and each extension conveyor segment 38 can include a transfer ramp 46 that extends in a distal (forward) direction 48 from the respective conveyor segment 38 to provide an inclined transition between successive conveyor segments 36, 38. The assembly of conveyor segments 32 can be laterally dimensioned for extension onto a flatbed trailer 50 or other shipping vehicle. In some implementations, the conveyor system 30 is configured to extend from a truck dock the full length of a 53-foot trailer to allow access by a robot in and out of the door, and to retract to a footprint that creates a small footprint inside the building. For example, the number of conveyor segments 32 and/or the length of individual segments 32 can be configured to achieve a small retracted footprint yet extend to over 53 feet.

In some implementations, the frame 34 can be configured as a mobile transport cart. In such implementations, the frame 34 may include casters 62. In some embodiments, each of the extension conveyor segments 38 is supported at a distal end with a support frame 66 that are mounted to casters 68. In some embodiments, the extendable conveyor system 30 includes one or more stabilizers 72 that are selectively extendible from the frame 34. In some implementations, the extendable conveyor system 30 includes a drive unit 74 mounted to the support frame 66 of a lead (forward most) conveyor segment 76 of the conveyor segment assembly 32. The drive unit 74 includes a drive wheel 78 that contacts the flatbed trailer 50 and is driven, for example, with a motor (not depicted). The drive unit 74 can be rotatable about a vertical steering axis 80. In some implementations the frame 34 is a stationary frame.

Functionally, the extendable conveyor system 30 facilitates the loading of packages onto a shipping vehicle, e.g., flatbed trailer 50. The nested arrangement of the assembly of conveyor segments 32 enables the extension conveyor segments 38 to be extended in the distal direction 48 relative to the base conveyor segment 36. For embodiments where the assembly of conveyor segments 32 are appropriately dimensioned, the extension conveyor segments 38 as well as the base conveyor segment 36 and frame 34 can be positioned at a rear end 92 of the flatbed trailer 50.

The stabilizers 72 act to selectively anchor the frame 34. The drive unit 74 acts to motivate the lead conveyor segment 76 in the distal direction 48, thereby extending the extension conveyor segments 38 as the lead conveyor segment 76 progresses distally. In some embodiments, the drive unit 74 is rotated about the vertical steering axis 80 to steer a forward end 94 of the lead conveyor segment 76 relative to the frame 34. In some embodiments, the drive unit 74 can also motivate the lead conveyor segment 76 in a proximal direction 96 for repositioning of the forward end 94 as loading of the flatbed trailer 50 progresses.

In operation, the extendable conveyor system 30 is positioned proximate the rear end 92 of the flatbed trailer 50 in the transport configuration 42. In some embodiments, one of the stabilizers 72 is grounded, enabling the frame 34 to pivot thereabout as the drive unit 74 extends and steers the assembly of conveyor segments 32 onto the flatbed trailer 50. Upon reaching the desired extension of the assembly of conveyor segments 32, any ungrounded stabilizers 72 may be grounded to secure the extendable conveyor system 30 proximate the rear end 92 of the flatbed trailer 50.

Referring to FIGS. 3 through 6, configurations for vertically positioning the forward end 94 of the lead conveyor segment 76 to a desired height 112 are depicted according to implementations of the disclosure. In some implementations, all of the conveyor segments 36, 38 of the assembly 32 are, when in the extended configuration 44, rotated vertically about a pivot 114 located on or proximate a rearward upright 116 of the frame 34 to effect the desired height 112 (FIG. 3) In some implementations, only the conveyor segments 36, 38 of the assembly 32 are rotated vertically about the pivot 114, with the pivot 114 being located at or proximate a forward upright 118 of the frame 34 (FIG. 4). In some embodiments, the pivot 114 is disposed at or proximate the support frame 66 of one of the extension conveyor segments 38 so that any of the extension conveyor segments 38 distal thereto can be inclined to effect the desired height 112 (FIG. 5). In some embodiments, the pivot 114 is disposed along the lead conveyor segment 76 for articulation thereof to the desired height 112 (FIG. 6).

In some implementations, the forward end 94 of the lead conveyor segment 76 is vertically positioned with a jack (not depicted) mounted to the support frame 66 of the lead conveyor segment 76. The jack can be manual or power driven. In some implementations, the support frames 66, as well as the forward upright 118 of the frame 34, are configured to vertically adjust as necessary to accommodate the changing height of the respective conveyor segment 36, 38 during adjustment of the desired height 112 of the forward end 94. The height adjustment of the support frames 66 may be passive, with support provided by pneumatic or hydraulic cylinders.

In some implementations, the extendable conveyor system 30 is configured to automatically align the forward end 94 within a confined region, such as within a flatbed trailer 50. For example, a trailer may be misaligned with a loading dock due to parking variations and such embodiments allow the conveyor system 30 to adjust for such variations while maintaining alignment with the trailer walls as it extends into the trailer. In such implementations, the extendable conveyor system 30 can automatically adjust its alignment within the trailer 50 as packages 122 are loaded into the trailer 50. For example, the extendable conveyor system 30 can include a system of alignment sensors 124 arranged at the forward end 94. The alignment sensors 124 can include distance measurement sensors, e.g., laser sensors, IR sensors, ultrasonic sensors, imaging sensors, stereoscopic sensors, or a combination thereof. The alignment sensor system 124 is configured to measure distances 128 between the front end 94 of the extendable conveyor system 30 and objects in front of the extendable conveyor system 30, e.g., the package wall 120 being formed within a flatbed trailer 50, the back wall of the trailer 50, or a package handling robot. In a manual loading configuration, the extendable conveyor system 30 can be configured to adjust is position within the flatbed trailer 50 in response to measurements from the alignment sensor system 124. For example, as the distance 128 decreases while a worker adds packages 122 from the extendable conveyor system 30 onto the package wall 120, the extendable conveyor system 30 can automatically retract to provide the worker with additional space between the forward end 94 and the package wall 120. Additionally, as discussed in more detail below, some implementations are also configured to use measurement data from the alignment sensor system 124 to align the extendable conveyor system 30 forward end 94 laterally within a trailer 50.

In some implementations, the extendable conveyor system 30 is configured to automatically buffer packages 122 as they are conveyed along the conveyor. For example, the extendable conveyor system 30 can include a package sensor system c. In an exemplary implementation, the package senor system 126 can be configured with a set of sensors 126 arranged along the extendable conveyor system 30. The package sensor system 126 can include gating sensors and/or vision sensors. For example, gating sensors can include line-break, e.g., optical sensors arranged along the extendable conveyor system 30 that detect the passage of packages moving along the extendable conveyor system 30. A control system (discussed below) can calculate package flow rate and adjust the speed of independently controlled conveyors along the extendable conveyor system 30 to maintain a manageable spacing between packages for a worker or a robot staking packages 122 at the forward end 94. As another example, the package sensor system 126 can be configured with vision sensors and employ an object identification processes, e.g., a machine learning network to detect package spacing and flow rate along the extendable conveyor system 30. The package buffering can be used to slow the rate of package flow or increase the rate depending on the rate that a package stacking robot, or a worker, is removing the packages from the conveyor system 30. In some instance, the conveyor system can shut down one or more conveyors to save energy, e.g., if the flow rate of packages from elsewhere in a distribution system is slow or sporadic due to arrival frequency of incoming deliveries.

Figure 7:
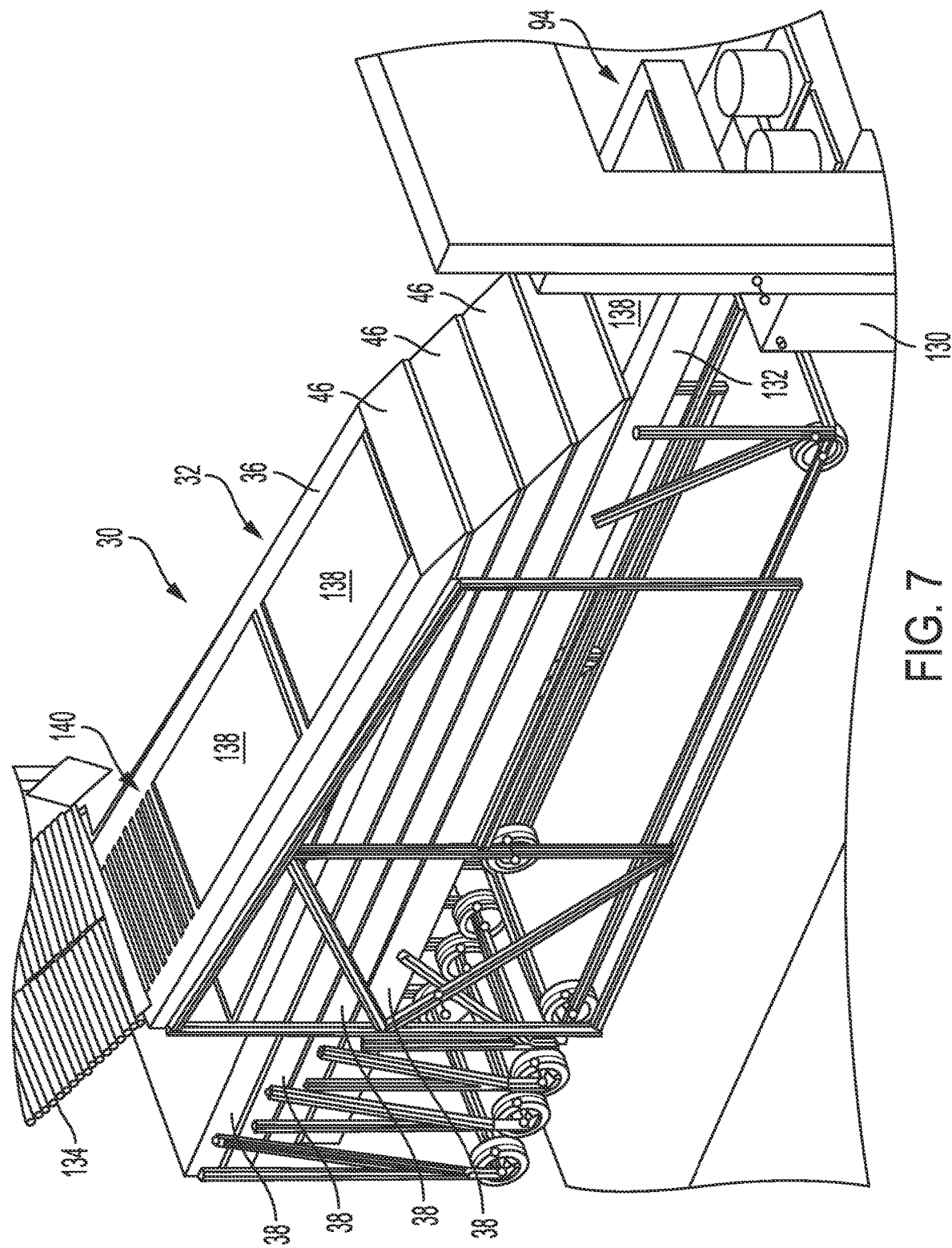
FIG. 7 is a perspective view of an exemplary implementation of the extendable conveyor system in a retracted configuration and configured to interface with a package handling robot.
Figure 8:
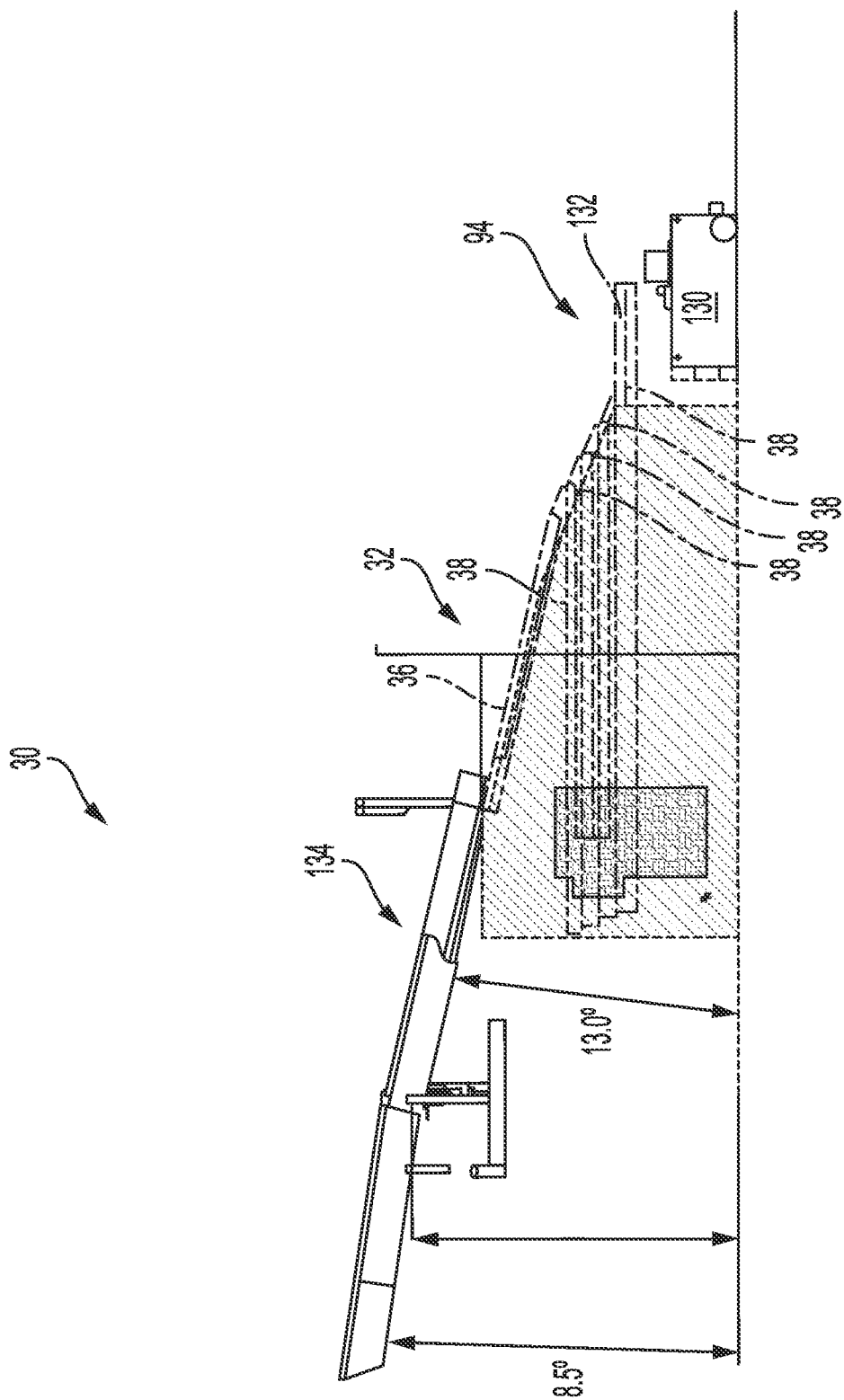
FIG. 8 is an elevation view of the exemplary implementation of the extendable conveyor system in a retracted configuration and interfacing with a package handling robot.

FIG. 7 is a perspective view of an exemplary implementation of the extendable conveyor system 30 in a retracted configuration and FIG. 8 is an elevation view of the extendable conveyor system 30 in a retracted configuration. The extendable conveyor system 30 is shown with the base conveyor segment 36 aligned below a gravity feed 134, e.g., in a sorting facility. The gravity feed 134 can be, e.g., a sheet metal chute, a chute with a package stop, or a chute with a powered conveyor and/or a package stop. Each conveyor segment 32 of the extendable conveyor system 30 can include an impact surface 140 and one or more independently controlled conveyor indexing sections 138. For example, the depicted implementation, the base segment 36 includes an impact surface 140 and two conveyor indexing sections 138. Other extension segments 38 can be configured the similarly to the base conveyor segment 36. The impact surface 140 is configured with a set of free spinning rollers. In some implementations, the rollers can be mounted on bearing supported by rubber or another type of shock absorber to absorb the impact of packages dropping to the impact surface 140. The conveyor indexing sections 138 are independently controllable sections of motorized conveyors. For example, each conveyor indexing section 138 can be an individual conveyor belt driven by motors that can be configured to operate independently of other conveyor indexing sections 138. In some implementations, the conveyor indexing sections 138 can be motorized rollers that that can be configured to operate independently of other conveyor indexing sections 138. In some implementations, the conveyor indexing sections can be configured with a combination of motorized and free spinning rollers. The motorized rollers can be configured to operate independently of other conveyor indexing sections 138.

The front end 94 is configured as a cantilevered end 132 to permit access underneath the forward end 94. For example, the cantilevered end 132 can be configured to permit a package handling robot 130 to fit underneath. For example, the cantilevered end 132 can permit a package loading platform of a robot 130 to fit underneath the forward end 94 so that packages fall from the extendable conveyor system 30 to the robot's platform. The robot 130 can be programed to remove packages from the conveyor or the robot 130 may have a presentation conveyor or platform that the package fall onto before they are stacked by the robot 130.

In some implementations, the extendable conveyor system 30 is configured to interface with a package handling robot 130. For example, in some implementations, the extendable conveyor system 30 can include an interface that couples a robot 130 to the extendable conveyor system 30. The interface can be configured for communications between the extendable conveyor system's 30 control system and the robot 130 (e.g., a wired or wireless communication interface) or can include a mechanical connection that allows the robot 130 to maneuver the forward end 94 of the extendable conveyor system 30. When used with a robot 130, the robot sends operating commands to the extendable conveyor system 30 to control movement of the conveyor system 30 and, e.g., to maintain a spacing interface between the robot 130 and the end of the conveyor system 30 as they both traverse in/out of a trailer.

In some implementations the extendable conveyor system 30 is configured to interface with the gravity feed 134 in a manner that forms a smooth transition between the gravity feed 134 and the base conveyor segment 36 of the extendable conveyor system 30. For example, the base conveyor segment 36, the gravity feed 134, or both can be oriented at angles with respect to one another that form a smooth transition between the two.

Figure 9:
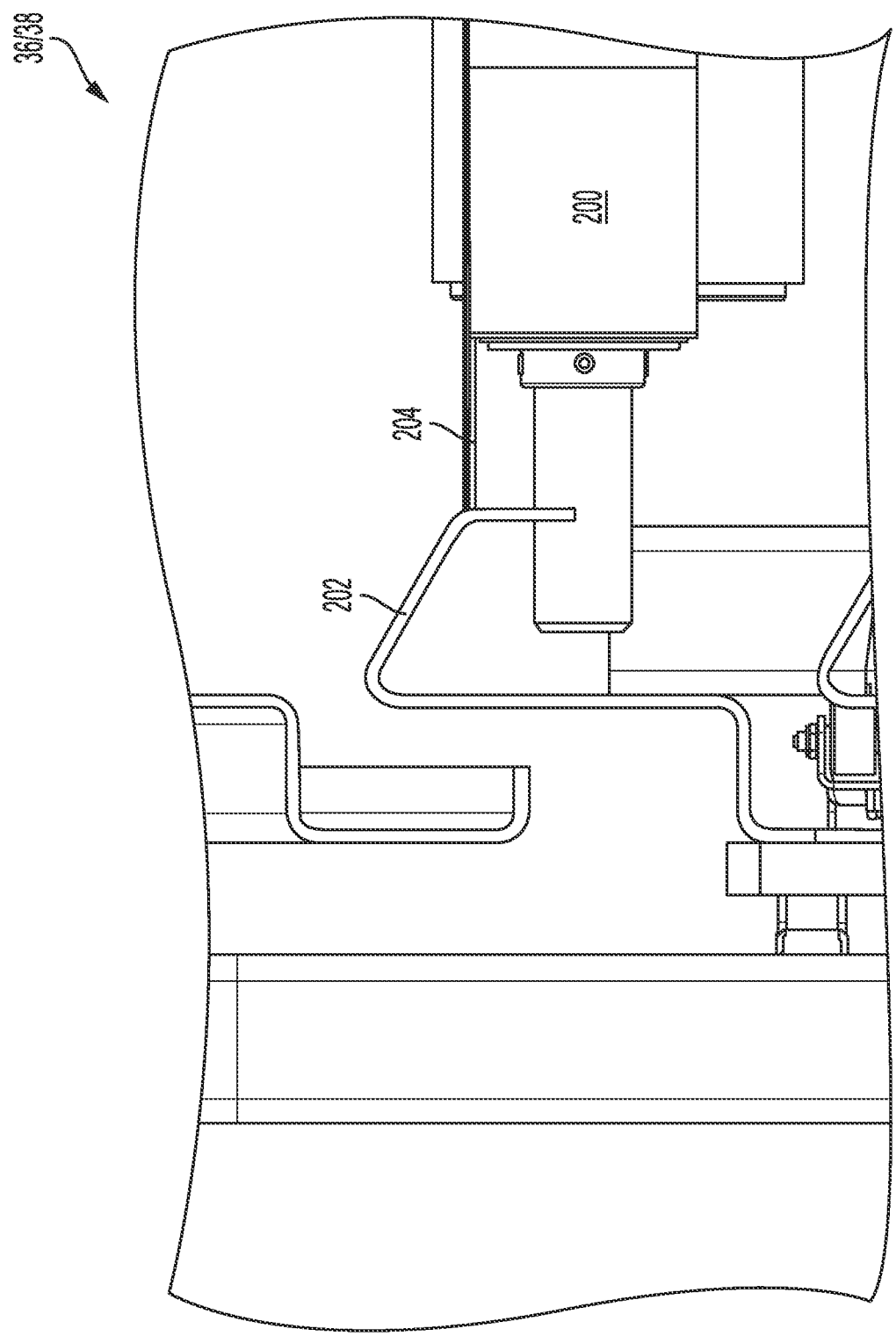
FIG. 9 is a detail view of a side edge of an implementation of the extendable conveyor system.

FIG. 9 depicts a detail view of a side edge of the extendable conveyor system 30. Each segment 32 of the extendable conveyor system 30 can include edging 202 that extends at an angle upward from the top surface of a conveyor belt 204 and/or rollers 200.

Figure 10:
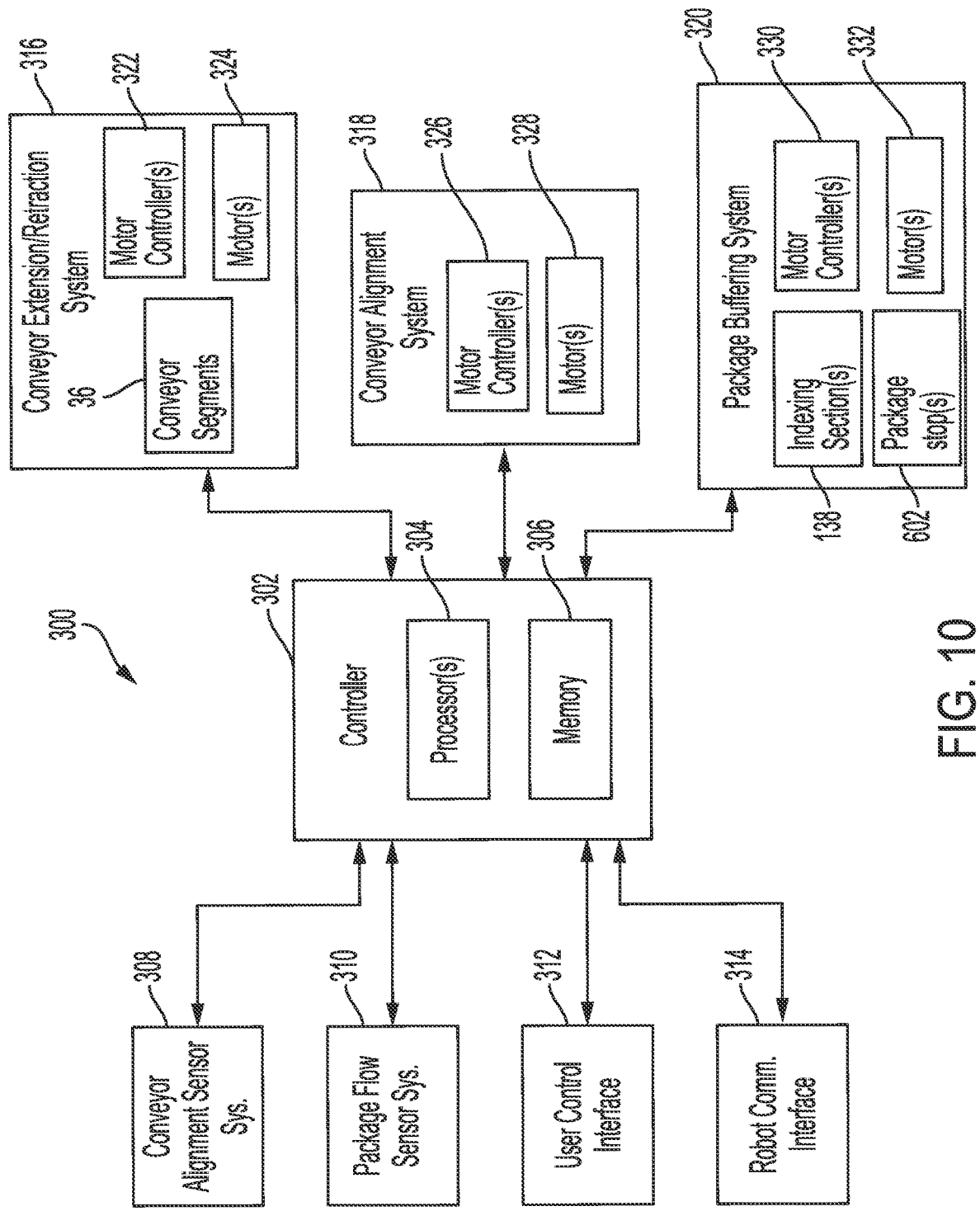
FIG. 10 is a block diagram of an exemplary control system for the extendable conveyor system.

FIG. 10 shows a block diagram of an exemplary control system 300 for the extendable conveyor system 30. The control system 300 includes a controller 302 in communication with various input and output systems. The controller 302 includes one or more processors 304 and computer memory 306. The computer memory can store instructions that are executed by the processor(s) 304 in order to perform control system operations described below.

Each of the input and output system can be configured as one or more computer executable software modules, hardware modules, or a combination thereof. For example, one or more of the input and output systems can be implemented as blocks of software code with instructions that cause one or more processors of the control system 300 to execute operations described herein. In addition or alternatively, one or more of the input and output systems can be implemented in electronic circuitry such as, e.g., programmable logic circuits, field programmable logic arrays (FPGA), or application specific integrated circuits (ASIC). The input systems can include a conveyor alignment sensor system 308, a package flow sensors system 310, a user control interface 312, and, optionally, a robot communication interface 314.

The output systems can include a conveyor extension/retraction system 31, a conveyor alignment system 318, and a package buffering system 320.

The conveyor alignment sensor system 308 can include the conveyor alignment sensors 124 discussed above. In addition, the conveyor alignment sensor system 308 can include sensors directed outward from the sides of the extendable conveyor system 30 forward end 94 and arranged to obtain measurement data indicating distances between the sides of the extendable conveyor system 30 and side walls of a trailer 50 (see FIGS. 12A-12D). The conveyor alignment sensor system 308 sensors can be arranged to aid in maintaining alignment of the forward end 94 laterally within a confined space and to manage distances from a package wall 120.

The package flow sensor system 310 can include the package sensor system 126 described above. In some implementations, where the package sensor system 126 includes imaging sensors, the package flow sensor system 310 can execute an image processing algorithm to identify packages within the images and preprocess the images before sending package flow data to the controller 302. For example, the package flow sensor system 310 can employ the image processing algorithm to determine package flow rate and package spacing along the extendable conveyor system 30. The package flow sensor system 310 can send the package flow rate and package spacing data to the controller 302. In some implementations, the package flow sensor system 310 includes a machine learning model trained to receive imagery data (e.g., a series of images or video) along the extendable conveyor system 30 as input and output package flow and spacing data. In some implementations, the package flow sensor system 310 can be configured to use a series of line break sensors to determine package flow and spacing. For example, package flow sensor system 310 can determine package flow rate and spacing based on the operating speed of individual conveyor indexing sections 138 adjacent to respective sensors and the timing between detected line breaks. Likewise, the package flow sensor system 310 can determine the sizes of each package based on the operating speed of individual conveyor indexing sections 138 adjacent to respective sensors and the duration of a line break. For example, a line break refers to the obstruction of an optical signal between two sensors positioned on opposite sides of the extendable conveyor system 30.

In response, the controller 302 can use the package flow rate and spacing data to adjust the speeds of individual conveyor indexing sections 138 to manage proper package spacing. For example, proper package spacing is a spacing between packages that conforms to the rate at which a worker or robot removes packages from the extendable conveyor system 30 and stacks them in the trailer 50. The control system 300 can be configured to adjust the proper package spacing to accommodate changes in the rate at which the worker or robot is working. For example, the package flow sensor system 310 can include a sensor at the forward end 94 that measures the time between a packages being removed from the extendable conveyor system 30 by the worker or robot. The controller 300 can determine the speeds at which to operate the conveyor indexing sections 138 so that packages arrive at approximately the same rate that the worker or robot is stacking them.

The user control interface 312 allows a user to manually control operations of the control system 300 and calibrate system operations. For example, the user control interface 312 can permit a user to maneuver the extendable conveyor system 30 to manually extend/retract and/or align the front end 94. In some implementations, the user control interface 312 can be permit a user to calibrate automated operations of the extendable conveyor system 30 by, e.g., adding or adjusting default values for a distance to maintain between the forward end 94 and a package wall 120, a lateral position for the extendable conveyor system 30 within a trailer 50, a package flow rate to maintain, etc. The user control interface 312 can be hardwired to the extendable conveyor system 30 or configured to interface with the control system 300 wirelessly. For example, the user control interface 312 can be a touch screen display or a mobile computing device (e.g., a tablet computer or laptop computer). In some implementations, the user control interface 312 can include a joystick to maneuver the extendable conveyor system 30.

The robot communication interface 314 is an electrical communication interface that permits a package handling robot 130 to communicate with the controller 302. For example, in some implementations, operations of the extendable conveyor system 30 can be controlled or directed by a robot 130. For example, the controller 302 can receive commands from a robot 130 through the robot communication interface 314 and operate the extendable conveyor system 30 responsive to such commands.

The conveyor extension/retraction system 316 is configured to control extension and retraction operations of the extendable conveyor system 30. For example, the conveyor extension/retraction system 316 includes one or more motors 324 coupled to one or more conveyor segments 36 and arranged to extend and retract the extendable conveyor system 30 conveyor segments 36. In addition, the conveyor extension/retraction system 316 includes one or more motor controllers 322 to control operation of the motors 324. For example, a motor controller 322 can be configured to receive digital commands from the controller 302 and operate the motors 324 in accordance with the commands. The conveyor extension/retraction system 316 can include two independent drive motors coupled to the drive wheels 78 discussed above. In some implementations, the motors are coupled to the drive wheels through a set of reduction gears. The extendable conveyor system 30 can be extended or retracted by controlling the drive motors. In some implementations, the conveyor extension/retraction system 316 can include drive wheels 78 and drive motors on each extension segment 36 so that each extensions segment 36 can be independently extended or retracted relative to neighboring segments. In general, the conveyor extension/retraction system 316 receives commands from the controller 302 and operates the drive wheels 78 in accordance with such commands to maneuver the extend and retract the extendable conveyor system 30.

In some implementations, the conveyor extension/retraction system 316 can include other mechanisms to extend and retract the extendable conveyor system 30. For example, the conveyor extension/retraction system 316 can employ motor driven worm gear or gear and rack configurations mounted between neighboring conveyor segments 36 to extend and retract the segments relative to one another.

The conveyor alignment system 318 is configured to control lateral motion of extendable conveyor system 30 forward end 94. The conveyor alignment system 318 includes one or more motors 328 coupled to the extendable conveyor system in order to move the forward end 94 laterally (or in an arc in the case that the extendable conveyor system 30 is mounted on a pivot point at the rearward end). In addition, the conveyor alignment system 318 includes one or more motor controllers 326 to control operation of the motors 328. As noted above, a motor controller 326 can be configured to receive digital commands from the controller 302 and operate the motors 328 in accordance with the commands. The conveyor alignment system 318 can also operate the drive wheels 78. For example, the conveyor alignment system 318 can include motors (e.g., servo motors) coupled to a support of the drive motors to pivot the drive wheel 78 ninety degrees so the forward end 94 can be maneuvered side-to-side. In some implementations, the conveyor alignment system 318 may be subsumed within or may be a sub-system to the conveyor extension/retraction system 316. In general, the conveyor alignment system 318 receives commands from the controller 302 and operates the drive wheels 78 in accordance with such commands to maneuver the forward end 94 of the extendable conveyor system 30.

The package buffering system 320 is configured to control the operation of the conveyor indexing sections 138 to maintain a buffer distance between packages conveyed along the extendable conveyor system 30. The buffering system 320 includes motors 332 coupled to drive units of each indexing section 138. The drive units can include one or more drive rollers in a belt conveyor or one or more drive rollers in a set of rollers in each indexing section 138. As noted above, motor controllers 330 can be configured to receive digital commands from the controller 302 and operate the motors 332 in accordance with the commands. The individual indexing sections 138 can be independently controlled by the controller 302 in response to input from the package flow sensor system 310 (e.g., a vision system), or by a robot 130 communicating with the controller 302. The controller 302 can control independently vary the speeds of the indexing sections 138 to maintain a package spacing and flow rate commensurate with the rate that packages are being removed from the front end of the conveyor system. Each indexing section 132 can be stopped or reversed, independent of the others, in order to maintain a desired package flow. In some examples, the indexing sections 138 can be stopped when a package is not present on them, e.g., to reduce power usage.

The package buffering system 320 can also control a series of one or more package stops 602 along the length of the conveyor system 30. The package stops 602 can be controlled to allow packages to enter the conveyor system (e.g., from the gravity feed 134) automatically and at a controlled rate. For example, the controller 302 can raise and lower the package stops 602 as a gate the flow of packages along with controlling the speed that the packages travel along the indexing sections 138. The controller 302 can control operation of the package stops 602 based on input from the package flow sensor system 310 (e.g., a vision system), or based on input commands from a robot 130 with a vision system.

In general, the package buffering system 320 receives commands from the controller 302 and adjusts the individual speed of appropriate indexing section(s) 138 in response to the commands. For example, the controller 302 receives package flow and spacing data from the package flow sensor system 310 and/or from the robot 130. The controller 302 can then determine whether the package flow rate is too fast or too slow for compared to the rate at which a worker or robot is removing the packages from the forward end 94. For example, using data from the package flow sensor system 310, the controller 302 can determine a package dwell time to track how long a package sits at the forward end 94 before a worker removes the package and stacks it in the trailer 50. For example, the package dwell time can be determined from an imaging sensor at the front end that detects a package arrival and tracks how long the package remains at the forward end 94 before the worker or robot removes it. As another example, the package dwell time can be determined based on a duration that a package triggers a line break sensor at the forward end 94. If the package dwell time is too long, e.g., it exceeds a threshold time, the controller 302 can operate the indexing sections 138 to slow the package flow rate. Alternatively, if a package dwell time is too short (e.g., indicating that packages are removed immediately when they arrive), the controller 302 can operate the indexing sections 138 to increase the package flow rate.

In some situations, packages may arrive at varying intervals. The controller can control upstream indexing sections 138 to adjust the package spacing. For example, if data from the package flow sensor system 310 indicates that two packages arrived one right after the other, the controller 302 can temporarily slow or stop the first indexing section 138 as soon as the first package passes from the first indexing section to the next subsequent indexing section on the extendable conveyor system 30. That way the two packages can be appropriately spaced. In implementations, that employ imaging sensors (e.g., computer vision), the controller 302 can monitor spacing between all packages along the extendable conveyor system 30 and adjust individual conveyor indexing sections 138 independently to maintain proper package spacing with real-time feedback provided by the imaging sensors.

In some implementations, the package buffering system 320 includes package stops (e.g., package stop 604 discussed below). The control system 300 can control operation of the package stops to aid in buffering packages. For example, the control system 300 can operate motors and/or hydraulic actuators to raise and lower a package stop 604 to moderate the flow of packages onto the extendable conveyor system 30.

Figure 13A:
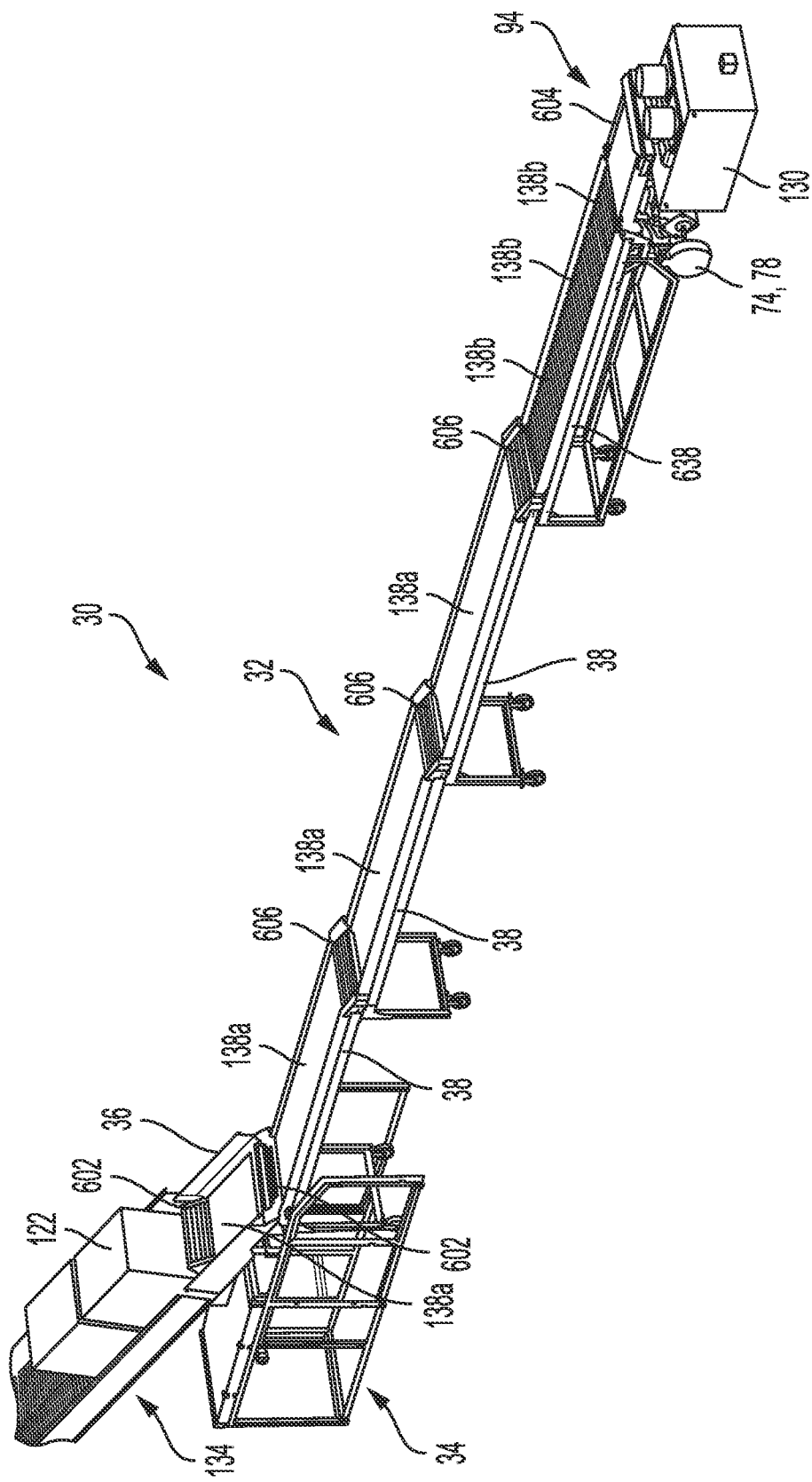
FIG. 13A is a perspective view of another implementation of an extendable conveyor system in an extended configuration.
Figure 13B:
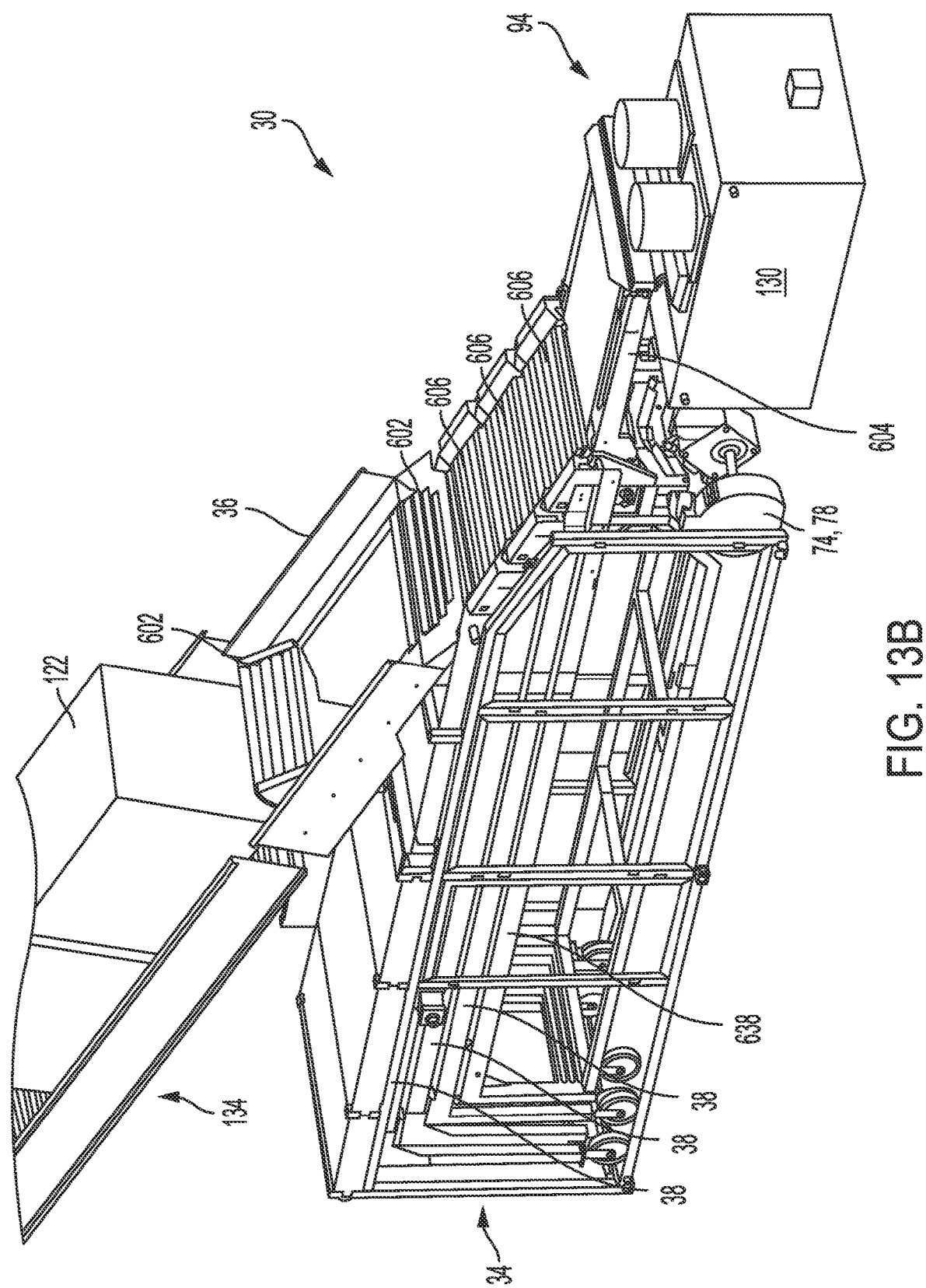
FIGS. 13B and 13C are perspective views of the extendable conveyor system implementation of FIG. 13A in a retracted configuration.
Figure 13C:
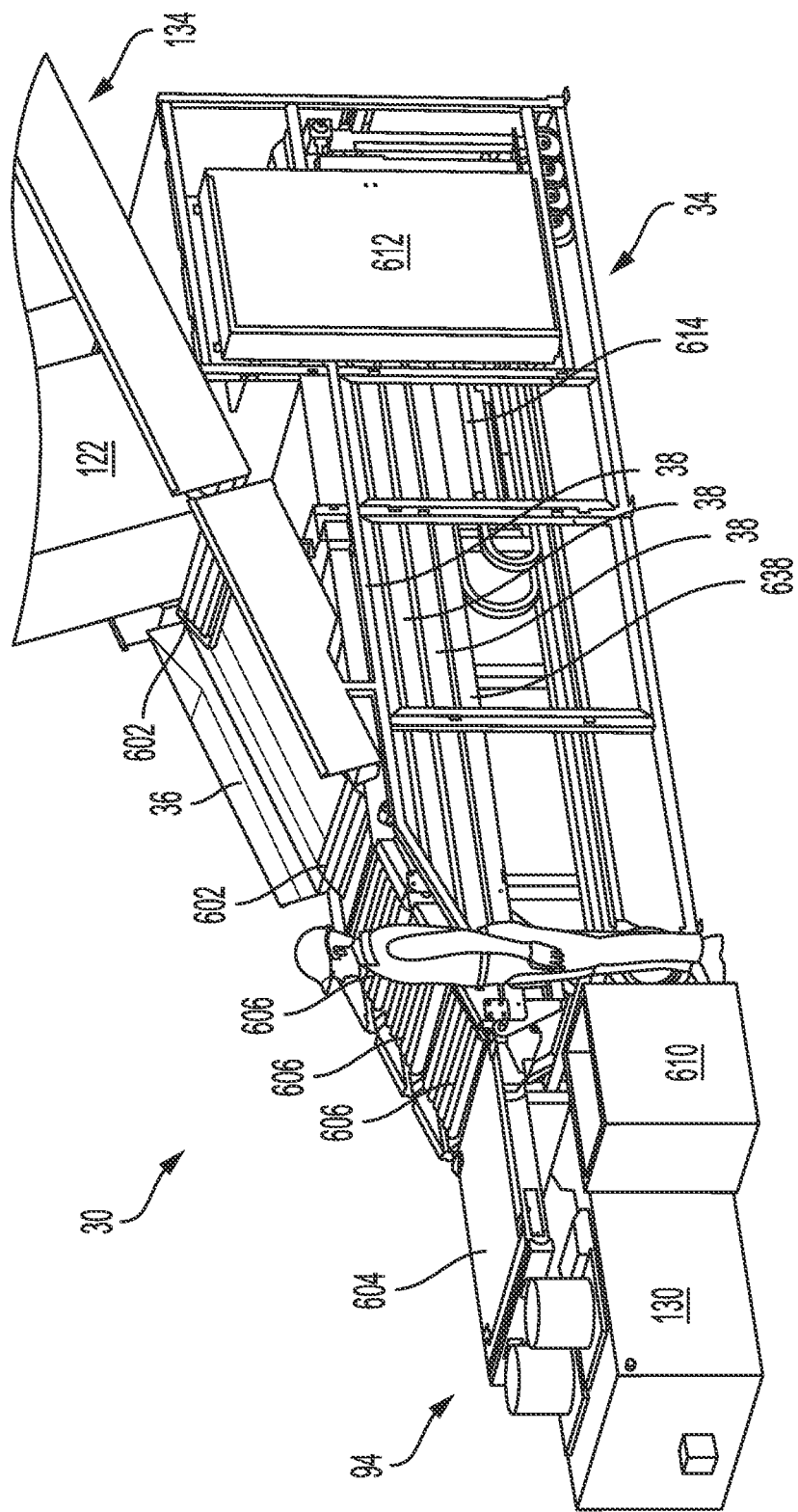

FIGS. 13A-13C depict another implementation of an extendable conveyor system 30. The implementation shown in FIGS. 13A-13C is generally similar to that described above with a few optional variations. The extendable conveyor system 30 is configured for mounting underneath the gravity feed 134. For example, the base conveyor segment 36 is shortened, which permits the fame to be positioned beneath the gravity feed 134. The base conveyor segment 35 also includes a package stop 602. The control system 300 can control operation of the package stop 602 to assist in buffering packages that transit the extendable conveyor system 30. For example, the package stop 602 can be controlled to selectively raise and lower to control the flow of packages 122 to the extendable conveyor system 30. For example, the control system 300 can operate the package stop 602 to permit packages 122 to pass individually or in groups.

The base conveyor segment 36 and each extensions conveyor segment 38 have a transition ramps 606 between segments. The transition ramps 606 can be a flat, low friction surface or can have free spinning rollers. In some implementations, the transition ramps 606 can have powered rollers, e.g., to assist moving packages in a reverse direction, up the extendable conveyor system 30 to assist with unloading a trailer.

The base conveyor segment 36 and each extensions conveyor segment 38, as shown, each have only one conveyor indexing section 138a implemented as conveyor belts. The last extension segment 638 has a different configuration from the three middle segments 38. Extension segment 638 employs all rollers with three conveyor indexing sections 138b using powered rollers, e.g., to assist with package buffering at the end of the extendable conveyor system 30. The control system 300 can control the direction and speed of each indexing section 138b independently to buffer packages, as discussed above.

Shown in FIG. 13C, the extension segment 638 can have an interface for attaching a purge cart 610. The purge cart 610 may be used to sort packages 122 that cannot be handled by the robot 130, e.g., damaged or oddly shaped packages 122. The purge cart 610 can be releasable coupled to extension segment 638 using a latch assembly and/or a pair of magnets. For example, the purge cart interface can be coupled to a sidewall or frame of extension segment 638. The purge cart connection interface allows the purge cart 610 to be moved alongside the extendable conveyor system 30 as the extendable conveyor system 30 is extended and retracted. In some examples, the purge cart is lower than the articulating end 604 so that non-pickable packages can be pushed in.

Also shown in FIG. 13C, a power supply 612 is be mounted to the frame 34. Flexible wire ways 614 are used to supply power to the conveyor segments 32.

Figure 14:
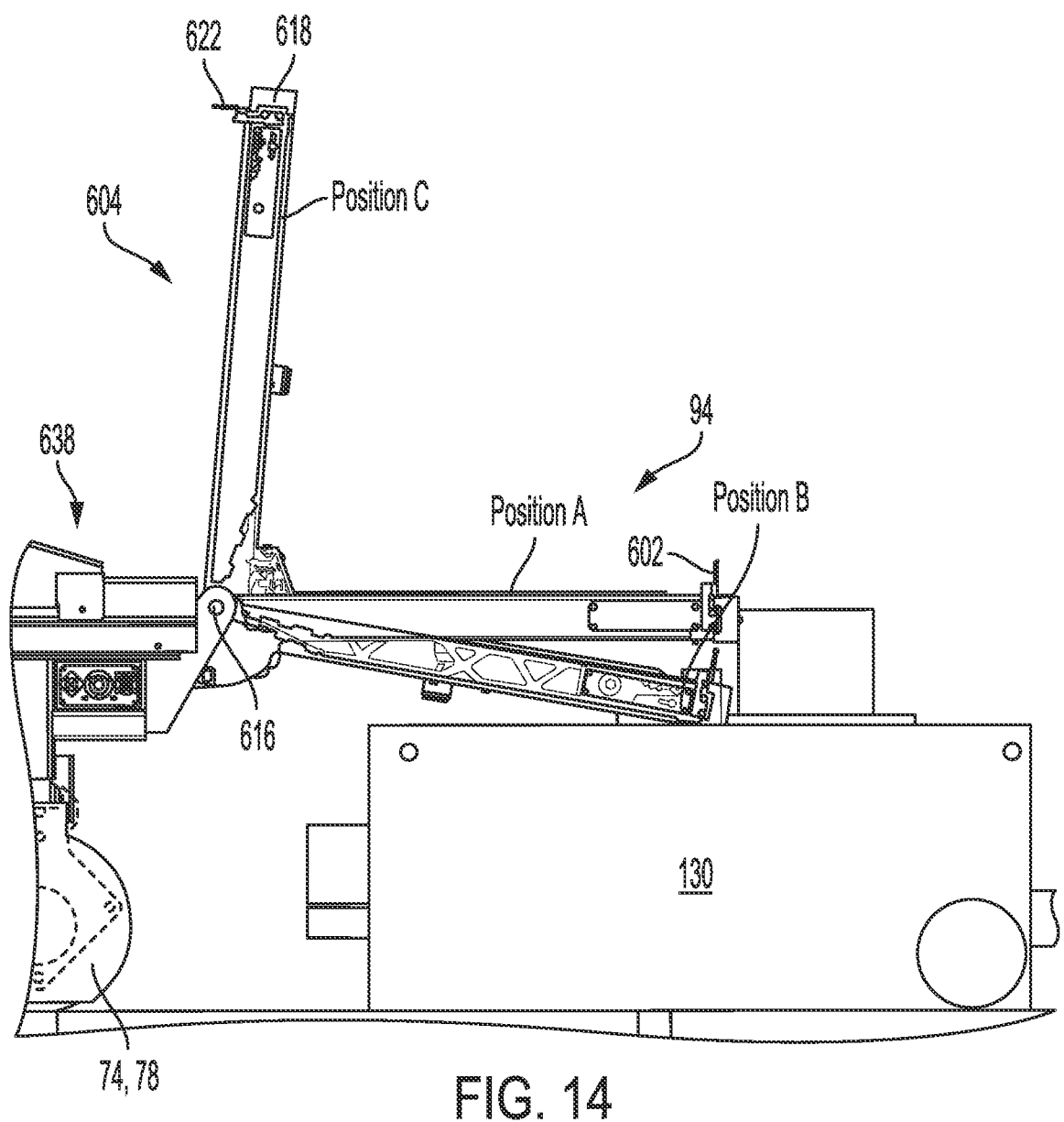
FIG. 14 is a detailed view of an articulating end of the extendable conveyor system implementation of FIG. 13A.

The forward end of extension segment 638 includes an articulating end 604. The articulating end can be controlled manually or by the control system 300 to make height adjustments and/or lateral adjustments. FIG. 14 is a detailed view of the articulating end 604 extension segment 638. As shown in FIG. 14, the articulating end 604 can be configured to articulate vertically to adjust the height of the extendable conveyor system 30 at the forward end 94. For example, the articulating end 604 can be mounted to extension segment 638 at a hinge joint 616 allowing the articulating end 604 to be pivoted automatically (through control system 300) or manually. articulating end 604 is shown in three positions. Position A is substantially horizontal and extends at the same height as the extension segment 638. This position may be used for interfacing with a package handling robot 130. In position B, the articulating end 604 is pivoted downward. This position may be used for manual unloading/loading packages from/to the extendable conveyor system 30. Position C is a storage positon. In some implementations, the articulating end 604 can be mounted on a vertical pivot that permits it to pivot laterally side-to-side. The articulating end 604 can include motors or hydraulics controlled by the control system 300 arranged to permit automated movement of the articulating end 604 relative to rest of extension segment 638.

Articulating end 604 includes a package stop 622, e.g., to prevent packages from falling off the end. The package stop 622 can be fixed. In some implementations, the package stop 622 is movable and can be raised/lowered, similar to package stop 602. The articulating end 604 can have a package indexing section 138 (e.g., a power conveyor belt or powered rollers) similar to the other conveyor segments 32.

Articulating end 604 can include a bumper 618 on the end. in some implementations, the bumper has a pressure sensor to detect if/when the articulating end 604 bumps against and object. The pressure sensor can serve to alert the control system 300, which can in turn, retract or stop motion of the extendable conveyor system 30 upon sensing a bump. In some examples, the articulating end 604 includes lights and/or reflectors on the forward end 94 and/or the sides.

Operation of the articulating end 604 can be controlled by the controller 302 independently or through commands from a robot 130. That is, controller 302 operating independently or through commands from a robot 130 can control the pivoting of the articulating end 604 (e.g., up/down or side to side), the operation of the conveyors or powered rollers on the indexing section 138 of the articulating end, and the operation of the package stop 602. In some implementations, the articulating end 604 serves as a package pick zone for a robot 130 or a worker. For example, when operating with a robot 130, multiple packages may be present on the articulating end 604 at a time (e.g., three packages in a row). If the robot 130 picks a package that is not in the middle or the back of the articulating end 604 (e.g., the second package in a row), it can command the controller 302 to advance the indexing section 138. This will move the packages at the back of the articulating end 604 forward while the front most package is prevented from falling off the edge by the package stop 602. In some implementations, the controller 302 can automatically sense where packages are located on the articulating end 604 and advance the indexing section 138 appropriately without control from a robot 130. For example, the controller 302 can control operation of the indexing section 138 on the articulating end 604 in a manner similar to that described, but in response to input from the package flow sensor system 310 (e.g., vision system) or from an array of pressure sensors under the indexing section 138 indicating package locations on the indexing section 138.

Figure 11:
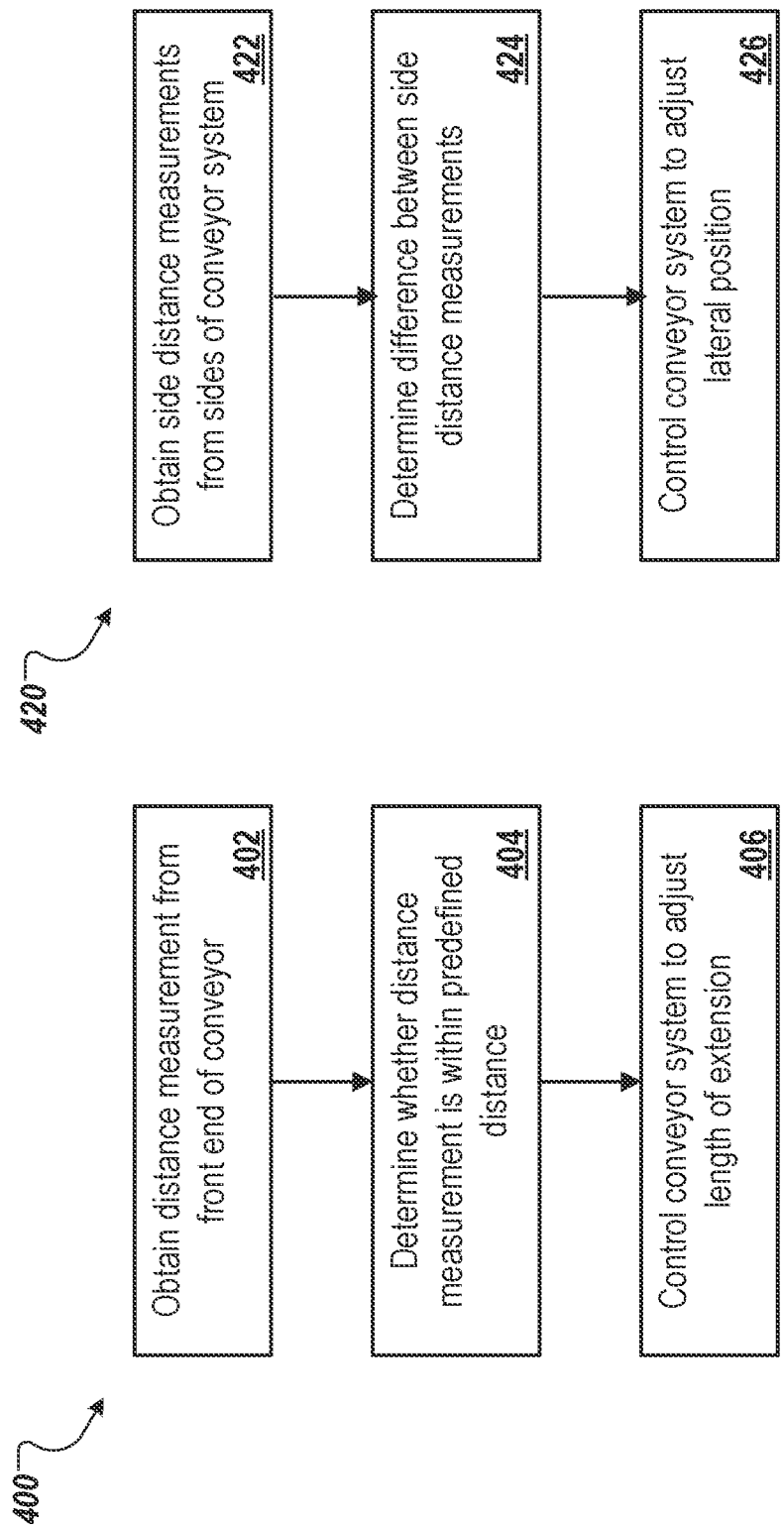
FIG. 11 depicts flow charts of alignment processes for an extendable conveyor system that can be performed by the control system of FIG. 10.

FIG. 11 depicts flow charts of alignment processes 400, 420 for operating an extendable conveyor system. Process 400 and 420 can be executed by one or more computing systems including, but not limited to, control system 300, described above, to control an extendable conveyor system 30. Processes 400 and 420 will be described with reference to FIGS. 11 and 12A-12D. FIGS. 12A-12D depict a series of overhead diagrams illustrating the operations of processes 400 and 420.

Process 400 is a process for automatically controlling the retraction of an extendable conveyor system 30 as packages are loaded into a trailer 50. The control system 300 obtains a first distance measurement between the forward end of the conveyor system and at least one object positioned in front of the conveyor system (402). For example, the control system can obtain one or more distance measurements (e.g., $d_1$ and $d_2$) from alignment sensors 124. In some implementations, a robot 130 can perform the measurements and transmit them to the control system 300. The object may be, e.g., a package wall 120, a front wall of a trailer 50, or a package handling robot 130. For example, when the extendable conveyor system 30 is used with a package handling robot 130, the control system 300 can maintain a desired distance to the robot 130 so that the end of the extendable conveyor system 30 is within reach of the robot 130. In such implementations, the control system 300 can store different distance settings. For example, a desired distance from a package wall under manual operations may be different than a desired distance from a robot 130 (e.g., since the forward end 94 can be cantilevered over part of the robot, the desired distance from the robot may be less than the desired distance from a package wall in manual operations).

The control system 300 determines that the first distance is less than a first predefined distance (404). For example, the control system 300 can compare the measured distance (s) to a predefined spacing (e.g., working distance) between the front end 94 and the back of the trailer or the package wall 120. If the measured spacing is less than the predefined spacing, then the control system 300 can retract the extendable conveyor system 30 (406). If the measured distance is greater than the predefined spacing, then the control system 300 can extend the extendable conveyor system 30. In some implementations, a variance distance can be used to avoid excessive movement of the extendable conveyor system 30.

For instance, the variance distance may define a permissible variance (e.g., 6 inches) from the predefined spacing. If the difference between the measured distance and the predefined distance is within the variance, the control system 300 does not extend or retract the extendable conveyor system 30. The control system 300 can control retraction/extension of the extendable conveyor system 30 by sending instructions to one or more motor controllers that cause the conveyor system to retract/extend until the measured distance is equal to or greater than the predefined spacing.

The predefined spacing can be a user set value, e.g., in the case of a manual trailer loading process. In some implementations, the user can adjust the predefined spacing value during operations.

In some implementations, the control system 300 can employ a time delay to account for temporary obstruction of one or more alignment sensors 124 by loading operations. For example, the control system 300 may require that any change in measurement distance persist for a period of time (e.g., 1-2 seconds) before any action is taken to retract the extendable conveyor system 30.

Figure 12A:
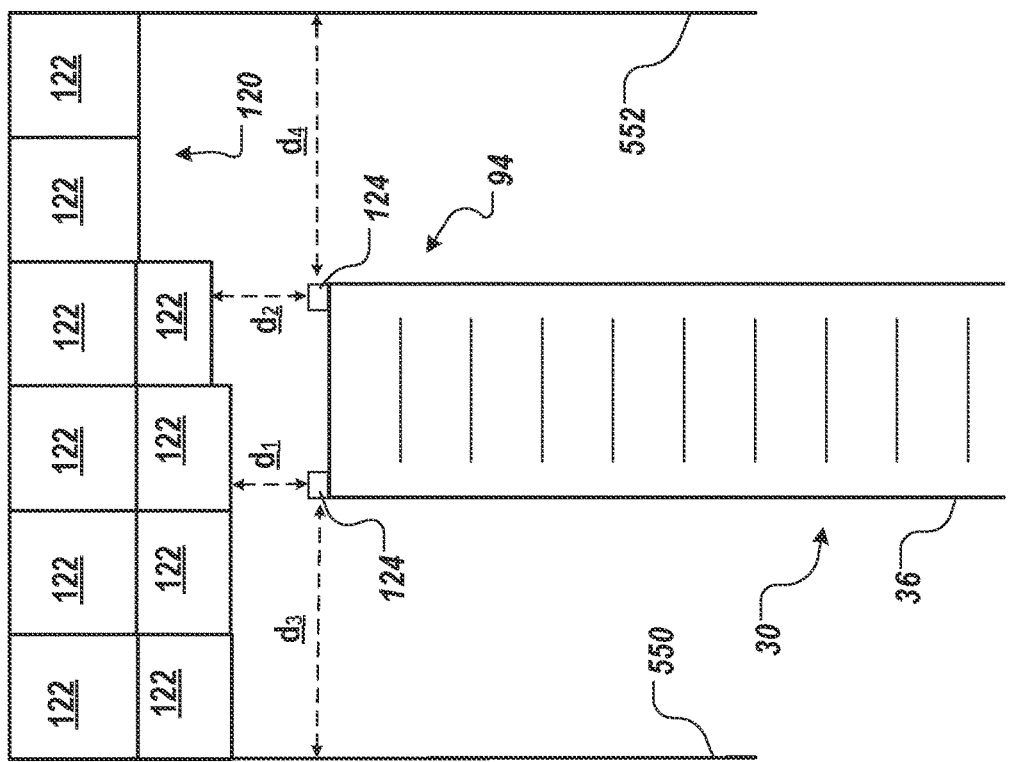
FIGS. 12A-12D depict a series of diagrams illustrating alignment operations of an extendable conveyor system within a shipping vehicle.
Figure 12B:
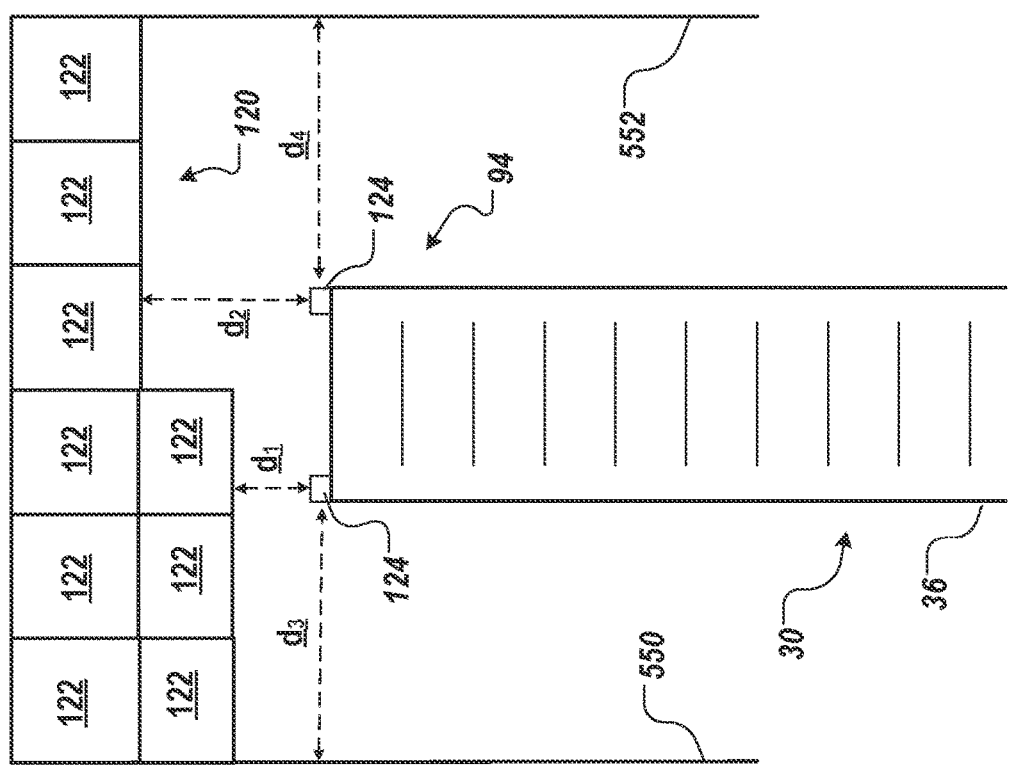
Figure 12D:
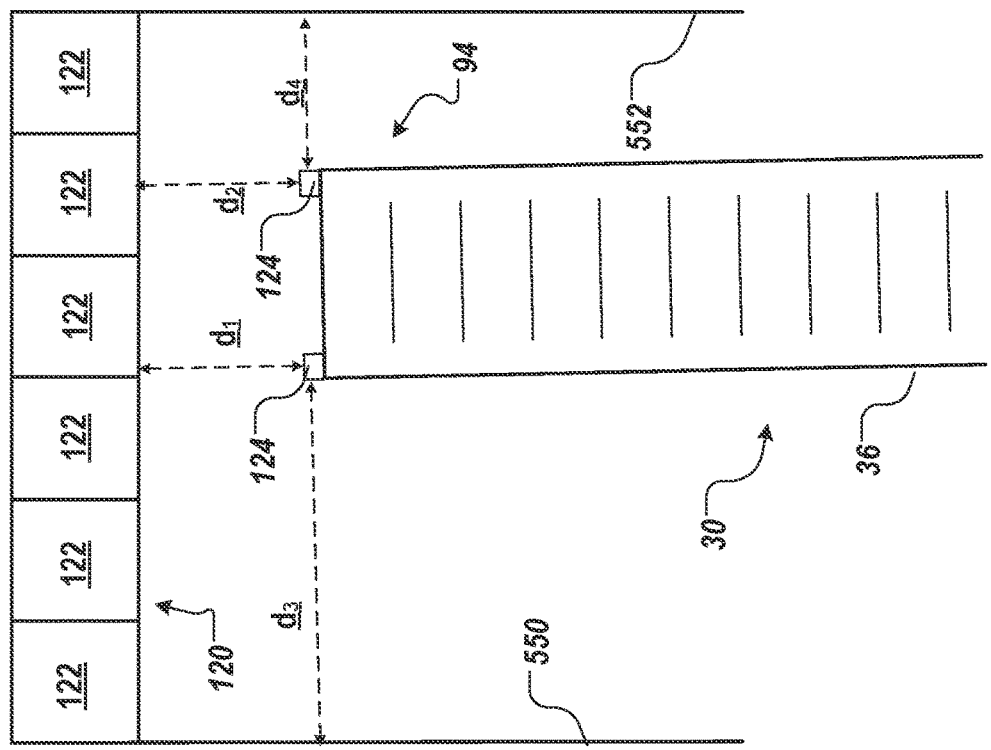
Figure 12C:
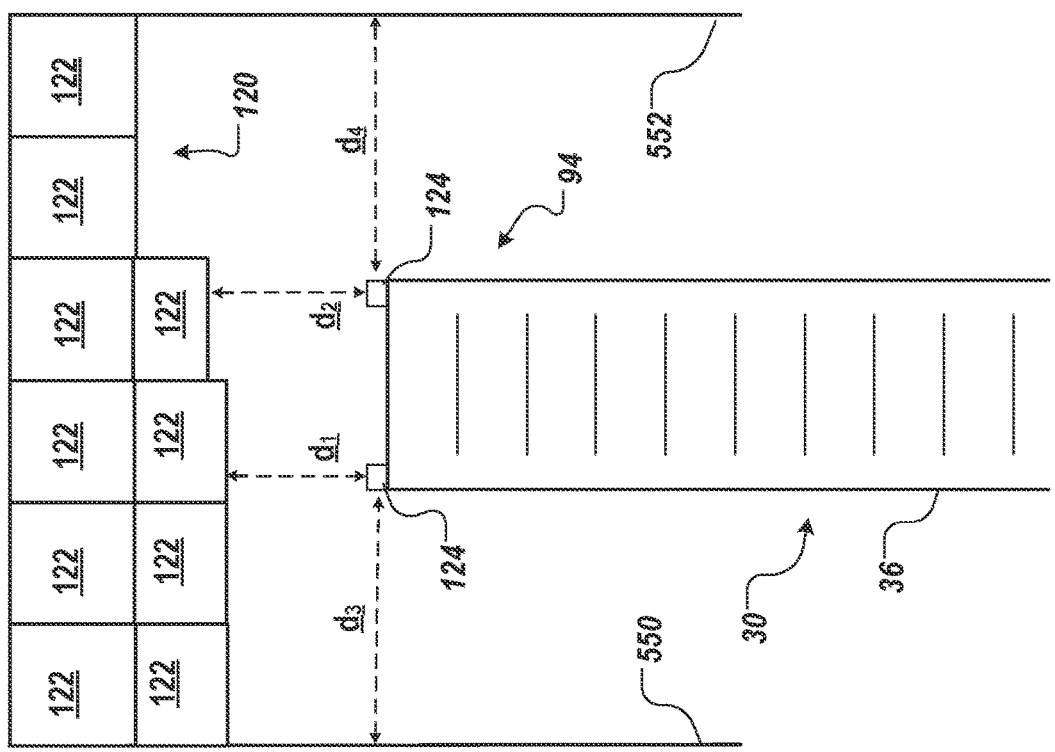

In some implementations, the control system 300 can use multiple distance measurements, as shown in FIGS. 12A-12C. For example, the control system may require multiple distance measurements to be less than the predefined spacing before initiating an action to retract the extendable conveyor system 30. As depicted in FIG. 12A, distance d1 is less than the predefined spacing because a package has been placed in front of the leftmost sensor. However, distance d2 is still within the predefined spacing, so the control system 300 will not yet retract the extendable conveyor system 30. When a package is placed in front of the right most sensor (as shown in FIG. 12B), then both d1 and d2 are less than the predefined spacing, so the control system 300 retracts the extendable conveyor system 30 (FIG. 12C), until the average, or mean value of all forward distance measurements ($d_1$ & $d_2$) are within the permitted variance of the predefined spacing. The control system can wait to retract the extendable conveyor system until all distance measurements are less than the predefined distance or it can use a majority rule process and retract when a majority of the forward facing sensors measure a distance less than the predefined spacing.

The control system 300 can control retraction of the extendable conveyor system 30 by sending instructions to one or more motor controllers that cause the conveyor system to retract until the measured distance is equal to or greater than the predefined spacing.

In some implementations, a package handling robot 130 can perform the process 400. In such implementations, the robot 130 can control operations of the extendable conveyor system 30 by sending comments to the control system 300. For example, the robot 130 can employ its own sensor and determine when to extend or retract the extendable conveyor system 30, then issue appropriate commands to the control system 300 that cause the control system 300 to operate the extendable conveyor system 30 accordingly.

With reference to FIGS. 11 and 12D, process 420 is a process for automatically aligning an extendable conveyor system 30 within a confined space (e.g., a trailer 50). The control system 300 obtains first and second distance measurements from either side of the conveyor at the forward end 95 (422). One measurement is a distance between the right side of the conveyor and a right side wall 550 of the trailer (e.g., $d_4$) and the other measurement is a distance between the left side of the conveyor and a left sidewall 552 of the trailer (e.g., $d_3$). For example, the measurements can be obtained from alignment sensors 124 positioned to take distance measurements from the sides of the extendable conveyor system 30.

The control system determines a difference between first and second distance measurements (424). If the measurements are different the extendable conveyor system 30 is misaligned within the trailer. The control system 300 can compare the difference to a threshold value (e.g., 6 inches). If the difference is greater than the threshold value then the control system 300 can control the extendable conveyor system 30 to adjust its lateral position within the trailer (426). For example, the control system 300 can control the extendable conveyor system 30 to move in the direction of the sensor that measured the greater distance so as to reduce the difference between the two measurements. For example, the control system 300 can send instructions to one or more motor controllers to pivot the drive wheels and move the forward end 94 to the left (as show in FIG. 12D).

Although the extendable conveyor system 30 has been described as performing trailer loading operations, it could also be used in an unload configuration. For example, the conveyor can be operated in the reverse direction and the process 400 can be performed in a similar manner to incrementally extend the extendable conveyor system 30 into a trailer as packages are removed from the trailer. As the measured distances become greater than the predefined spacing, the extendable conveyor system 30 is incrementally extended to maintain the spacing. Furthermore, in an implementation capable of performing both loading and unloading operations the transition ramps 606 can be designed with a low-profile and/or can include powered rollers to assist in moving packages up the conveyor.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "controller" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks, and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

While this document contains many specific implementation details, these should not be construed as limitations on the scope of what may be claimed, but rather as descriptions of features that may be specific to particular implementations or embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

The invention claimed is:

1. An extendable conveyor system comprising:
a plurality of conveyor segments interlocked in a telescoping configuration with individual conveyor segments at least partially overlapping one another;
a conveyor extension/retraction system operatively coupled to at least one of the conveyor segments and configured to control the extension and retraction of the extendable conveyor system by controlling movement of the conveyor segments relative to one another; and
a control system in electrical communication with the conveyor extension/retraction system and configured to perform operations comprising adjusting a position of one or more conveyor segments responsive to data received from a package handling robot in electronic communication with the control system,
wherein the plurality of conveyor segments comprise a base conveyor segment configured to receive packages from a gravity chute, an end conveyor segment, and one or more middle conveyor segments arranged between the base conveyor segment and the end conveyor segment,
wherein the base conveyor segment of the plurality of conveyor segments comprises a package stop configured to raise and lower responsive to control signals from the control system,
wherein the one or more middle conveyor segments each comprise an independently controllable conveyor belt, and
wherein a forward most conveyor segment comprises:
a plurality of rollers including at least a first set of powered rollers and a second set of powered rollers with the first set of powered rollers separated from the second set of powered rollers by a set of unpowered rollers, and
an articulating end configured to pivot relative to a forward end of the end conveyor segment.

2. The extendable conveyor system of claim 1, wherein each conveyor segment comprises one or more indexing sections, and
wherein the operations comprise controlling a speed of one indexing section independent from other indexing sections responsive to second data received from the package handling robot.

3. An extendable conveyor system comprising:
a plurality of conveyor segments interlocked in a telescoping configuration with individual conveyor segments at least partially overlapping one another;
a conveyor extension/retraction system operatively coupled to at least one of the conveyor segments and configured to control the extension and retraction of the extendable conveyor system by controlling movement of the conveyor segments relative to one another;
a sensor system; and
a control system in electrical communication with the conveyor extension/retraction system and with the sensor system, the control system configured to perform operations comprising:
obtaining, from the sensor system, a first distance between a front end of the conveyor system and at least one object positioned in front of the conveyor system;
determining that the first distance is less than a first predefined distance; and
in response to the first distance being less than the first predefined distance, controlling the conveyor extension/retraction system to move the conveyor segments to increase a distance from the at least one object,
wherein the plurality of conveyor segments comprise a base conveyor segment configured to receive packages from a gravity chute, an end conveyor segment, and one or more middle conveyor segments arranged between the base conveyor segment and the end conveyor segment,
wherein the base conveyor segment of the plurality of conveyor segments comprises a package stop configured to raise and lower responsive to control signals from the control system,
wherein the one or more middle conveyor segments comprise each comprise an independently controllable conveyor belt, and
wherein a forward most conveyor segment comprises:
a plurality of rollers including at least a first set of powered rollers and a second set of powered rollers with the first set of powered rollers separated from the second set of powered rollers by a set of unpowered rollers, and
an articulating end configured to pivot relative to a forward end of the end conveyor segment.

* * * * *